United States Patent
Hans et al.

(10) Patent No.: US 6,813,258 B2
(45) Date of Patent: Nov. 2, 2004

(54) DETECTION METHOD AND DEVICE

(75) Inventors: Martin Hans, Hildesheim (DE); Frank Kowalewski, Salzgitter (DE); Josef Laumen, Hildesheim (DE); Gunnar Schmidt, Wolfenbuettel (DE); Siegfried Baer, Pforzheim (DE); Mark Beckmann, Hameln (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/937,956

(22) PCT Filed: Dec. 28, 2000

(86) PCT No.: PCT/DE00/04672

§ 371 (c)(1),
(2), (4) Date: Jan. 4, 2002

(87) PCT Pub. No.: WO01/56162

PCT Pub. Date: Aug. 2, 2001

(65) Prior Publication Data

US 2002/0154615 A1 Oct. 24, 2002

(30) Foreign Application Priority Data

Jan. 28, 2000 (DE) .......................................... 100 03 734

(51) Int. Cl.[7] .......................... H04J 11/00; H04B 7/216; H04B 1/69; H04B 1/713
(52) U.S. Cl. ........................ 370/335; 370/342; 370/441; 370/208; 375/146; 375/130
(58) Field of Search ................................ 370/335, 342, 370/441, 320, 328, 508, 519, 331, 332, 311; 375/146, 130, 144, 200, 206, 208, 342, 347

(56) References Cited

U.S. PATENT DOCUMENTS

| | | | | |
|---|---|---|---|---|
| 5,533,047 A | * | 7/1996 | Mourot et al. .............. | 375/208 |
| 5,544,156 A | * | 8/1996 | Teder et al. ................. | 370/342 |
| 5,566,206 A | * | 10/1996 | Butler et al. ................. | 375/225 |
| 5,910,964 A | * | 6/1999 | Sugita ......................... | 375/200 |
| 5,940,433 A | * | 8/1999 | Sawahashi et al. ......... | 375/206 |
| 6,091,757 A | * | 7/2000 | Cudak et al. ............... | 375/130 |
| 6,108,369 A | * | 8/2000 | Ovesjo et al. .............. | 375/146 |
| 6,163,524 A | * | 12/2000 | Magnusson et al. ........ | 370/208 |
| 6,167,037 A | * | 12/2000 | Higuchi et al. ............. | 370/335 |
| 6,222,875 B1 | * | 4/2001 | Dahlman et al. ........... | 375/200 |
| 6,233,231 B1 | * | 5/2001 | Felix et al. ................. | 370/335 |
| 6,240,099 B1 | * | 5/2001 | Lim et al. ................... | 370/441 |
| 6,301,293 B1 | * | 10/2001 | Huang et al. ............... | 375/206 |
| 6,381,229 B1 | * | 4/2002 | Narvinger et al. .......... | 370/328 |

(List continued on next page.)

FOREIGN PATENT DOCUMENTS

| WO | WO 99 03225 | 1/1999 |
|---|---|---|
| WO | WO 01 24395 | 4/2001 |

OTHER PUBLICATIONS

Hasanudin, H. et al., "Reducing Switch Delay by Reconstruction of Tree Structured Orthogonal Codes in CDMA Mobile Switching System", Workshop Notes, IEEE International Workshop on Intelligent Signal Processing and Communication System, Dec. 8, 1999, pp. 585–588.

*Primary Examiner*—Man Phan
(74) *Attorney, Agent, or Firm*—Kenyon & Kenyon

(57) ABSTRACT

A detection method in which a CDMA-coded data signal is transmitted in the form of a data stream of spread data bursts between a transmitter and a receiver, hierarchical CDMA codes being used for the transmission. In a first step, codes having a smaller spreading factor than a maximally to be detected spreading factor are detected. In a second step, codes having a larger spreading factor than in the previous step are detected, the detection results of the first step being taken into account. In a third step, the detection process is broken off if all codes are detected, or otherwise the second step is repeated with the detection results last obtained in each instance, until all codes are detected.

8 Claims, 1 Drawing Sheet

U.S. PATENT DOCUMENTS 6,393,047 B1 * 5/2002 Popovic ...................... 375/140
6,400,755 B1 * 6/2002 Harris et al. ................ 375/146
6,424,618 B1 * 7/2002 Uesugi et al. .............. 370/208
6,477,158 B1 * 11/2002 Take .......................... 370/335
6,526,065 B1 * 2/2003 Cheng ........................ 370/441
6,532,250 B1 * 3/2003 Palenius et al. ............ 375/141
6,560,194 B1 * 5/2003 Gourgue et al. ........... 370/203

* cited by examiner

DETECTION METHOD AND DEVICE

FIELD OF THE INVENTION

The present invention relates to a detection method in which a CDMA-coded data signal is transmitted in the form of a data stream of spread data bursts between a transmitter and a receiver, hierarchical CDMA codes being used for the transmission, as well as a corresponding detection device.

BACKGROUND INFORMATION

Although applicable in principle to any data transmissions, the present invention and the idea upon which it is based are explained with reference to a cellular CDMA detection system (CDMA=code division multiple access).

In particular, using code multiple access (CDMA code division multiple access), a plurality of data streams can be transmitted simultaneously via a shared frequency band. In this context, the data-stream symbols to be transmitted are converted by so-called spreading codes into signal pieces having the length of the spreading codes. The signal pieces of the data symbols of one instant are summed up, and the summed pieces are sent according to their chronological sequence, as is known from *Nachrichtenübertragung* [Information Transmission] by K. D. Kammeyer, 2nd edition, Information Technology Series, Teubner, Stuttgart, 1996.

The data symbols of the data streams can be recovered from the received signal pieces by despreading using the spreading codes. When transmitting the signals over a plurality of paths (as, for example, in the case of mobile radio communications), it is advantageous to carry out the despreading separately for all paths, and to sum up the despread signals of all paths weighted (with the coefficients of the channel pulse response). A CDMA receiver functioning in this manner is called a rake receiver.

The multi-path transmission causes mutual interferences of the transmitted signals at the receiver. In contrast to the rake receiver, these interferences can be eliminated, for example, by joint detection (JD=joint detection) in the receiver, as is known from "*Zero Forcing and Minimum Mean-Square-Error Equalization for Multiuser Detection in Code-Division Multiple Access Channels*" by A. Klein, G. K. Kaleh and P. W. Baier, IEEE Trans. Vehic. Tech., Vol. 45 (1996), 276–287.

CDMA codes having a large spreading factor can be constructed from two codes having a smaller spreading factor by Kronecker multiplication. A quantity of CDMA codes thus constructed is called hierarchical. The OVSF codes (OVSF=Orthogonal Variable Spreading Factor) used in the UMTS (UMTS=Universal Mobile Telephone System) are hierarchically constructed codes (see Concept Group Alpha: "EVALUATION DOCUMENT (DRAFT 1.0), Part 1", ETSI Tdoc SMG2 270/97).

It is furthermore known that initially the received CDMA signals having a smaller than necessary spreading factor are detected, and are subsequently despread with the codes used for constructing the hierarchical code.

Large spreading factors permit the use of a great number of codes. The detection of a great number of codes is very costly.

SUMMARY OF THE INVENTION

An idea underlying the present invention is that the codes are detected stepwise. First, codes having a small spreading factor are detected. The results thus obtained are then used in detecting codes having a larger spreading factor. Consequently, only a part of the total code tree has to be detected, since only the despread signals of existing codes are passed on to the next step. The existence is expediently determined by the fact that the power (performance) of the codes exceeds a specific threshold.

The detection method and device of the present invention offer the special advantage that they permit detection of hierarchical codes with lower expenditure.

According to one preferred further development, in the first step, the master (parent) code $c^{(1,1)}$ having the spreading factor 1 is detected.

In another preferred embodiment, only a part of the total code tree is detected.

According to a further preferred refinement, OVSF codes are detected.

In another preferred development, the respective preceding step is taken into account in the manner that the powers of the CDMA signals already despread are determined, and only the already despread CDMA signals which exceed a predefined power threshold are passed on to the next step.

DETAILED DESCRIPTION

Figure 1:
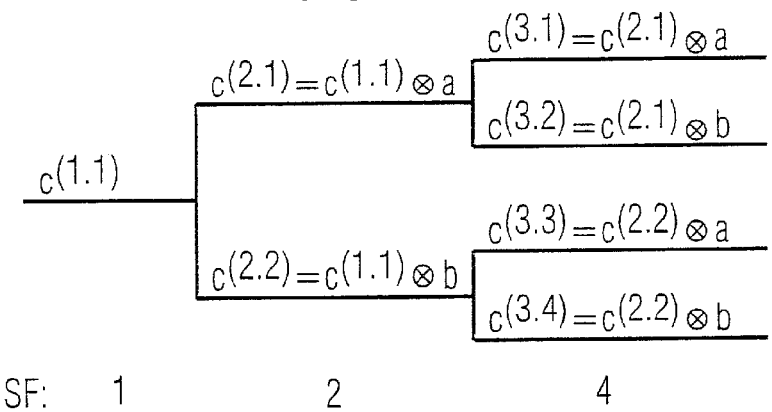
FIG. 1 shows a representation of a hierarchical code tree for clarifying one specific embodiment of the present invention.

FIG. 1 shows the structure of hierarchical codes. In FIG. 1, SF designates the spreading factor and $c^{(i,j)}$ designates the associated spreading code.

From a given code $c^{(i,j)}$ having a smaller SF, codes $c^{(i+1,k)}$ having a larger SF are formed by Kronecker multiplication using generators a, b.

The structure of hierarchical codes makes it possible to despread hierarchically spread data iteratively by a corresponding "inverse Kronecker multiplication" in the receiver.

In the present example, a CDMA data transmission with hierarchical codes takes place via a multi-path channel with OVSF codes according to FIG. 1 and a rake receiving method in the receiver.

However, the rake receiving method differs significantly from the related art, since the complete despreading is not carried out in the rake receiver, but rather in downstream despreaders. In the specific example, the rake receiver does not carry out any despreading at all.

Figure 2:
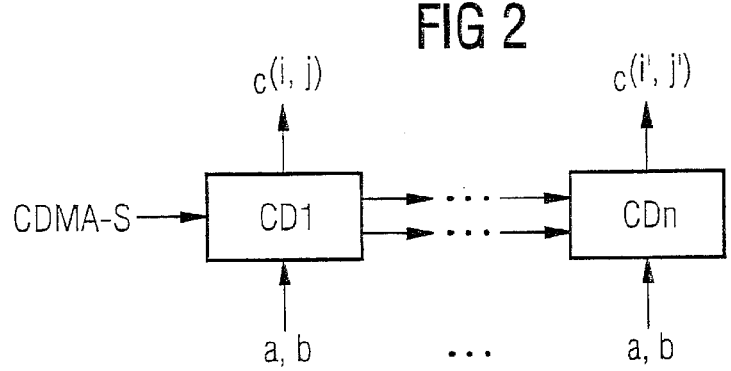
FIG. 2 shows a block diagram of a device for detecting hierarchically coded CDMA signals according to one specific embodiment of the present invention.
Figure 3:
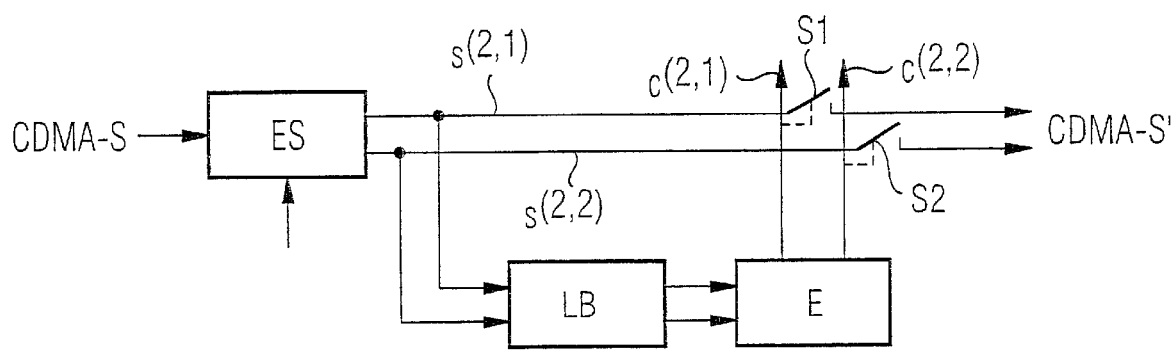
FIG. 3 shows a schematic representation of the design of the code detectors for the specific embodiment of the present invention according to FIG. 2.

FIG. 2 shows a block diagram of a device for detecting hierarchically coded CDMA signals according to one specific embodiment of the present invention, and FIG. 3 shows a schematic representation of the structure of the code detectors for the specific embodiment of the present invention according to FIG. 2.

A first code detector CD1 receives the CDMA signal, CDMA-S, sampled in the chip clock pulse. This signal is despread with generator codes a, b in first code detector CD1.

Resulting despread signals $s^{(2,1)}$ and $s^{(2,2)}$ (sampled in half chip clock pulse) are supplied to power calculation unit LB.

Decision unit E decides that a corresponding code is present when the calculated power of the associated despread signal exceeds a threshold value.

Decision unit E gives to a relay device S1, S2 in the form of two switches, a corresponding control signal to relay despread signals $S^{(2,1)}$ and $S^{(2,2)}$ to the second step (denoted together as CDMA-S') when the specific appertaining code is present, otherwise not.

Thus, for example, it is assumed that code $c^{(1,1)}$ is contained in the CDMA signal, CDMA-S, to be analyzed. In the first detector step, it is then determined in code detector CD1 that code $c^{(2,1)}$ is not present, but that code $c(2,2)$ probably is.

Therefore, only code $c^{(2,2)}$ is passed on to the next step. In the next step, just the despread CDMA signal with respect to code $c^{(2,2)}$ is further processed. It is then determined whether codes $C^{(3,3)}$ and $C^{(3,4)}$ are present. The sub-codes with respect to code $c^{(2,1)}$ no longer need to be checked, since they cannot be present if $c^{(2,1)}$ is not present.

Although the present invention was described above in light of a preferred exemplary embodiment, it is not restricted to it, but can be modified in diverse ways.

In particular, the method of the present invention can be used in all detection systems which employ a transmission mode that uses hierarchical CDMA codes.

What is claimed is:

1. A detection method comprising:
   despreading a hierarchical coded CDMA signal into a first signal and a second signal having a smaller spreading factor than a maximally-to-be-detected spreading factor;
   testing for a presence of a code in the first signal and the second signal; and
   for each of the first signal and the second signal containing the code, performing the processes of despreading into a third signal and a fourth signal having a larger spreading factor and testing for a presence of a code.

2. The method according to claim 1, wherein the presence of a code is tested for after despreading the CDMA signal using a spreading factor of 1.

3. The method according to claim 1, wherein a code is tested for in only one of the first signal and the second signal and the processes of despreading and testing are not performed on the other signal.

4. The method according to claim 1, wherein the code is an OVSF code.

5. A detection method in which a CDMA-coded data signal is transmitted in the form of a data stream of spread data bursts between a transmitter and a receiver, hierarchical CDMA codes being used for the transmission, the method comprising:

(a) detecting codes having a smaller spreading factor than a maximally-to-be-detected spreading factor;
   (b) detecting codes having a larger spreading factor than in step (a), as a function of detection results of step (a);
   (c) if all of the codes are detected, breaking off the detection process, and, if all of the codes are not detected, repeating step (b) with detection results last obtained in each instance, until all of the codes are detected; and taking into account a respective preceding step in the manner that powers of CDMA signals despread with codes already detected are determined, and only the despread CDMA signals which exceed a predefined power threshold are passed on to a next step.

6. A device comprising:
   a despreading arrangement for despreading a hierarchical coded CDMA signal into a first signal and a second signal having a spreading factor;
   a testing arrangement for testing for the presence of a code in the first signal and the second signal; and
   a relaying arrangement for relaying the first signal if the first signal contains a code and for relaying the second signal if the second signal contains a code.

7. A device comprising:
   a receiving device performing the following steps:
   (a) detecting codes having a smaller spreading factor than a maximally-to-be-detected spreading factor, and
   (b) detecting codes having a larger spreading factor than in step (a);
   an assessment device for assessing which codes belonging to the smaller spreading factor are detectable in step (a); and
   a relay device for relaying detection results to a next step, wherein the assessment device carries out a power assessment, and judges those codes whose power lies above a preselected threshold value to be detectable.

8. The device according to claim 6, wherein the relaying arrangement comprises a switching arrangement controllable by the testing arrangement.

* * * * *

UNITED STATES PATENT AND TRADEMARK OFFICE
CERTIFICATE OF CORRECTION

PATENT NO. : 6,813,258 B2
DATED : November 2, 2004
INVENTOR(S) : Martin Hans et al.

It is certified that error appears in the above-identified patent and that said Letters Patent is hereby corrected as shown below:

Column 3,
Line 12, change "is not present, but that code c(2,2)" to -- is not present, but that code $c^{(2,2)}$ --

Signed and Sealed this

Twenty-first Day of June, 2005

JON W. DUDAS
*Director of the United States Patent and Trademark Office*